United States Patent

De Biase

[11] Patent Number: 6,120,871
[45] Date of Patent: *Sep. 19, 2000

[54] LOADING DOCK BUMPERS

[75] Inventor: Joseph De Biase, Rexdale, Canada

[73] Assignee: Frommelt Industries of Canada Inc., Vaughan, Canada

[*] Notice: This patent is subject to a terminal disclaimer.

[21] Appl. No.: 08/911,168

[22] Filed: Aug. 14, 1997

Related U.S. Application Data

[63] Continuation-in-part of application No. 08/529,537, Sep. 18, 1995, Pat. No. 5,658,633.

[51] Int. Cl.$^7$ .................................................. B63B 59/02
[52] U.S. Cl. ........................ 428/68; 114/219; 405/212; 405/215; 428/71; 428/75; 428/76; 428/323; 428/327
[58] Field of Search .................................. 428/68, 75, 71, 428/76, 323, 327; 405/212, 215; 114/219

[56] References Cited

U.S. PATENT DOCUMENTS

| | | | |
|---|---|---|---|
| 3,933,111 | 1/1976 | Von Bose | 114/219 |
| 4,509,730 | 4/1985 | Shtarkman | 267/35 |
| 5,658,633 | 8/1997 | Di Biase | 428/68 |

Primary Examiner—Nasser Ahmad
Attorney, Agent, or Firm—Ivor M. Hughes; Neil H. Hughes; Marcelo K. Sarkis

[57] ABSTRACT

A loading dock bumper comprising:

(a) a first rigid part for fastening to said dock
(b) a second rigid part engaged with said first rigid part by at least one connecting device, said second rigid part being moveable with respect to said first rigid part between a first and a second position, and said first and said second rigid parts when engaged defining a substantially enclosed hollow therebetween; and
(c) a compressible resilient material dispersed between said first and second rigid parts within the hollow therebetween, wherein said second part is moveable with respect to the first part between the first position wherein the resilient material is not compressed and the second position wherein said resilient material is compressed, wherein any load applied to said bumper moves the second part towards the second position and compresses the resilient material to provide dampening of the load applied.

24 Claims, 14 Drawing Sheets

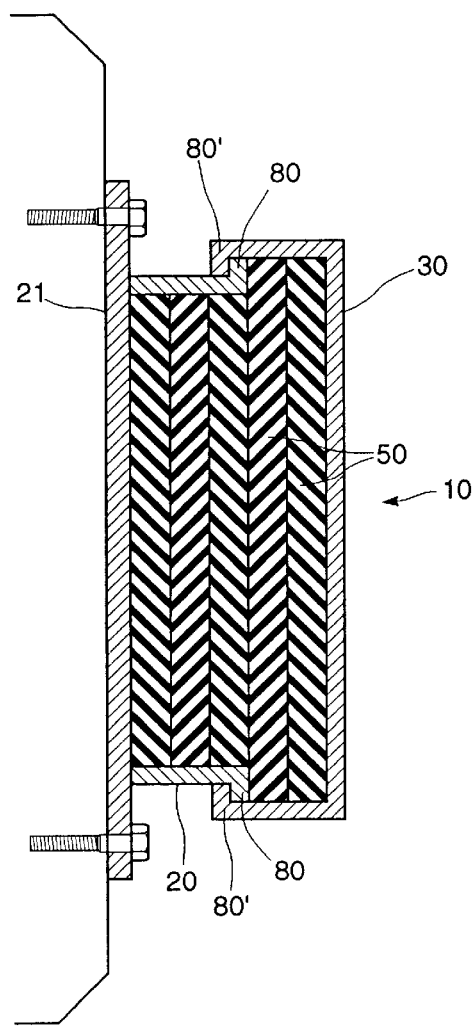
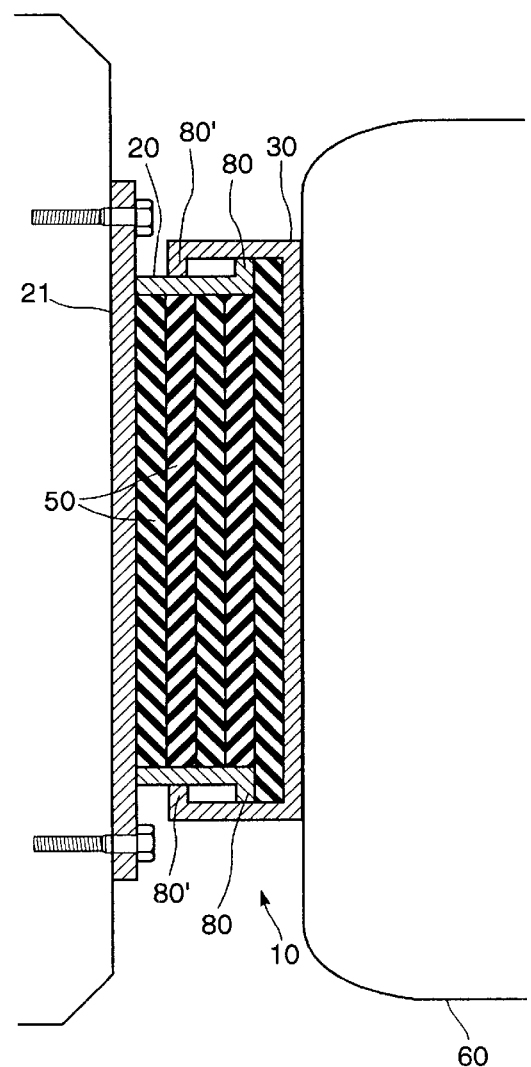
FIG. 1
FIG. 2

LOADING DOCK BUMPERS

This Application is a Continuation-In-Part Application of U.S. application Ser. No. 08/529,537 filed Sep. 18, 1995, now U.S. Pat. No. 5,658,633, the contents of which application are incorporated herein by reference.

BACKGROUND OF THE INVENTION

The present invention relates generally to a resilient bumper used for protecting loading docks and other structures subject to damaging impacts of a vehicle, for example a transport vehicle when positioning up against a loading dock or the like. More particularly, the present invention relates to a loading dock bumper construction which provides the operator of a vehicle with a visual signal to guide the vehicle along a pathway to a predetermined proper position. The construction provides for and further indicates excessive wearing away of material in the bumper and enables the removal and replacement of such material.

The use of rubber tires and also pieces of rubber tires put together and fashioned in different ways is known in the art of loading dock bumpers. The art of cutting tires into almost flat sections and stacking these sections together to create a flexible and/or resilient stack is also known in the art.

U.S. Pat. No. RE 24276 to Schuyler, issued Feb. 12, 1957, discloses a loading dock bumper consisting of a plurality of resilient rubber like strips arranged face-to-face in a stacked relationship, and these strips are secured together at the two ends of the stack by a pair of angle brackets such that the rubber strips are directly exposed to the vehicle.

U.S. Pat. No. 3,165,305 to Pfleger, issued Jul. 12, 1965, discloses a truck dock bumper constructed from a stack of flat, rectangular rubber units, the stack having a rectangular tie bar extending therethrough from end-to-end to prevent sagging of the bumper in its middle and an offsetting relationship in the location of the mounting angles at the opposite ends of the bumper permitting close end-to-end disposition of adjacent bumpers.

U.S. Pat. No. 3,353,812 to Miller, issued Nov. 21, 1967, discloses a bumper constructed from a plurality of stacked rubber strips mounted and supported for attachment on a marine dock, loading dock and the like, by means of supports at least one of which is loosely mounted on the bumper.

U.S. Pat. No. 5,094,905 to Murray, issued Mar. 10, 1992, discloses a dock bumper constructed of rubber fragments mixed with an adhesive and bonded together, the rubber fragments being produced by fragmenting at least one tire containing rubber and strands of reinforcing material used to reinforce the tire, wherein a sufficient quantity of adhesive is mixed with the rubber to create a free standing article having structural integrity said dock bumper formed under pressure in a mold having the desired shape for a time period sufficient for the adhesive to set.

Since bumpers of this sort receive repeated impacts from vehicles, with time, due to the friction, the bumper will deteriorate. All bumpers of this type heretofore available have had at least one serious defect. Bumpers in service for a while and prior to their removal and replacement when worn, would deteriorate to a level which would interfere with the cushioning (dampening) function of the bumper thereby damaging the loading dock and/or vehicle which is backing up against the bumper.

It is also frequently necessary to accurately position a vehicle, such as a truck, within close proximity to a door opening in a building wall to facilitate the loading or unloading of the vehicle. In this case, along with similar cases, an operator must accurately guide the vehicle along a pathway, bringing it to a defined position in relationship to surrounding stationary structures, enclosures, or spaces.

It is not uncommon for damage to occur to the vehicle and/or surrounding structures which may be obscured from the driver's line of sight during the positioning process. Moreover, the initial positioning of the vehicle may be unsatisfactory. If this is the case, the positioning operation may have to be repeated, thereby leading to the possibility that damage will occur during repositioning. Alternatively, if repositioning is not performed, other consequential problems, such as difficulty in loading and unloading cargo, frequently arise. These and other problems inherent in vehicular positioning operations are well recognized, and various devices and techniques have been envisioned or devised to overcome such problems.

In the past, a number of different vehicle positioning guides have been proposed, such as, for instance, Tucker U.S. Pat. No. 3,893,068, issued Jul. 1, 1975, which discloses a guide device for use in the backing up of a towed trailer into a parking space which includes a pair of light containing units each having a housing with a light source contained therein and batteries contained therein for powering the light source, with each having a port extending through the front thereof for directing light forwardly therefrom, and a port disposed in the sides thereof to direct light sideways from the unit, one unit being positioned on each side of the parking space into which the trailer is to be backed into such that the units are visible to the vehicle driver and thus acting as guides for backing the trailer into the parking space.

In addition, White U.S. Pat. No. 5,285,205, issued Feb. 8, 1994, which discloses a vehicle guidance and positioning system utilizing a laser, the emitted beam from which is directed over the path along which a vehicle is to be guided. The laser beam impinges on a target area located on the vehicle in such a manner that the impingement of the laser beam on the target is continuously observable by the vehicle's operator. The operator steers the vehicle so that the laser beam continuously impinges on the target area until the vehicle reaches a preselected position in a confined space.

The prior art solutions appear to be complex devices which are expensive to manufacture, install and maintain.

Furthermore, upon the loading and/or unloading of a truck at a loading dock, a commonly used fork-lift will ride into the truck to drop-off or pick-up a load. Frequently, damage may occur to the forks and tires of the forklifts from loading dock bumpers during loading and/or unloading. As well, during loading the extra weight of the load and the fork lift moving onto and out of the truck will cause the truck's bumper to get caught on the top of the loading dock bumper resulting in difficulties when moving away from the loading dock.

It is thus an object of the invention to provide a bumper, preferably a loading dock bumper, with a wear indicator providing a quantitative measure of the amount of resilient material remaining in connection with the safe and effective operation of the bumper and indicates when the resilient material of the bumper is dangerously worn and should be replaced.

It is yet another object of the invention to provide a bumper, preferably a loading dock bumper, that has a substantially long wear life.

It is yet another object of the invention to provide a bumper, preferably a loading dock bumper, with a chamfered edge for preventing damage to forklifts or the like during loading and/or unloading and preventing a vehicle from becoming stuck on a loading dock bumper and causing problems during disengagement from the loading dock.

It is yet another object of the invention to provide a bumper, preferably a loading dock bumper, with a mounting element for removably mounting the bumper to facilitate the removal and replacement of the bumper when worn.

It is yet another object of the invention to provide a bumper, preferably a loading dock bumper, with a vehicle guidance and positioning system to quickly and accurately aid an operator in the guidance of a vehicle, leading the vehicle to the desired position at the loading dock both at night and during the day without requiring the assistance or guidance of other individuals.

It is yet another object of the invention to provide a bumper, preferably a loading dock bumper, that is economical to produce.

It is yet another object of the invention to provide a bumper, preferably a loading dock bumper, which uses waste material in the production thereof.

Further and other objects of the invention will be apparent to a person skilled in the art reading the following:

SUMMARY OF THE INVENTION

According to one aspect of the invention, there is provided a loading dock bumper comprising:

(a) a first rigid part for fastening to said dock (b) a second rigid part preferably said second part further comprises a front having a top and a bottom, when proximate said top there is at least one substantially chamfered edge, said second rigid part engaged with said first rigid part by at least one connecting device, preferably in one embodiment, said at least one connecting device is a plurality of engaging flanges, said second rigid part being moveable with respect to said first rigid part between a first and a second position, and said first and said second rigid parts when engaged defining a substantially enclosed hollow therebetween; and (c) a compressible resilient material, said resilient material is laminate rubber dispersed between said first and second rigid parts within the hollow therebetween, wherein said second part is moveable with respect to the first part between the first position wherein the resilient material is not compressed and the second position wherein said resilient material is compressed, wherein any load applied to said bumper moves the second part towards the second position and compresses the resilient material to provide dampening of the load applied preferably said second part further comprises at least one vehicle positioning indicia, preferably substantially recessed.

In yet another aspect of the invention, a loading dock bumper for use with a loading dock, said loading dock bumper comprising:

(i) a substantially enclosed container comprising a first half, said first half having a back, and four sides extending substantially normal to said back, at least two of said four sides of said first half further comprise a flange on each of said two sides, (ii) a second half substantially larger than said first half made of substantially carbon steel, said second half having a front, and four sides extending substantially normal to said front, preferably said front further comprises a substantially chamfered edge proximate at least one side thereof, wherein at least two of said four sides of said second half further comprise a flange on each of said two sides, wherein said flanges of said second half sides matingly engage with said flanges of said first half sides, when assembled with said first half and provide for movement of said first and second halves relative to each other forming a substantially enclosed hollow container, wherein said mating flanges prevent disassembly of said halves as said first half and said second half move between a first position and a second position; and (iii) an effective amount of substantially compressible resilient material contained within the hollow of said substantially enclosed container such that in the first position, said back of said first half and said front of said second half are a predetermined distance from each other due to the rubber material being substantially uncompressed within said hollow of the substantially enclosed container and upon the introduction of a load to said substantially enclosed container, said resilient material is substantially compressed by the load substantially dampening the load as said second half moves towards said first half, preferably said loading dock bumper further comprises a substantially chamfered edge proximate at least one side thereof, preferably said loading dock bumper further comprises at least one vehicle positioning indicia.

In yet another aspect of the invention, a method of manufacture of a loading dock bumper for use with a loading dock, said loading dock bumper comprising:

(i) a substantially enclosed container comprising a first half, said first half having a back, and four sides extending substantially normal to said back, at least two of said four sides of said first half further comprise a flange on each of said two sides, (ii) a second half substantially larger than said first half made of substantially carbon steel, said second half having a front, and four sides extending substantially normal to said front, wherein at least two of said four sides of said second half further comprise a flange on each of said two sides, wherein said flanges of said second half sides matingly engage with said flanges of said first half sides, when assembled with said first half and provide for movement of said first and second halves relative to each other forming a substantially enclosed hollow container, wherein said mating flanges prevent disassembly of said halves as said first half and said second half move between a first position and a second position; and (iii) an effective amount of substantially compressible resilient material contained within the hollow of said substantially enclosed container such that in the first position, said back of said first half and said front of said second half are a predetermined distance from each other due to the rubber material being substantially uncompressed within said hollow of the substantially enclosed container and upon the introduction of a load to said substantially enclosed container, said resilient material is substantially compressed by the load substantially dampening the load as said second half moves towards said first half, wherein said method comprises:

(i) placing a predetermined effective amount of compressible resilient material in said manufactured first half to an overfilled capacity, (ii) placing said front of said second half on top of said first half and applying pressure thereto, (iii) attaching said at least two sides of said second half comprising said flanges to said front of said second half to matingly engage said flanges of said second half sides with said flanges of said first half sides, (iv) removing said pressure on said front of said second half, and (v) attaching said sides of said second half without flanges to said front of said second half and said sides of said second half with flanges, preferably said loading dock bumper further comprises at least one vehicle positing indicia.

In yet another aspect of the invention, a loading dock bumper for use with a loading dock, said loading dock bumper comprising:

(i) a substantially enclosed container comprising a first half, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon, preferably said loading dock bumper further comprises a collar connecting said at least one substantially elongated aperture with said at least another substantially elongated aperture, (ii) a second half substantially larger than said first half, said second half having a front, and four sides extending substantially normal to said front, preferably said front further comprises a substantially chamfered edge proximate at least one side thereof, at least one aperture located at a predetermined position on one of said sides of said second half, and at least another aperture located at a predetermined position on one of the other sides of said second half opposed said side having said at least one aperture thereon, said second half and said apertures thereof matingly fitting over and aligning with said first half and the elongated apertures thereof proximate the sides thereof, forming a substantially enclosed hollow container, such that said elongated apertures of said first half and said apertures of said second half are substantially axially aligned with each other when the first and second halves are inter-fitted, (iii) a connecting device running through the apertures, connecting the first half with the second half, wherein said connection allows said first half and said second half to be substantially moveable with respect to each other, (iv) an effective amount of substantially compressible resilient material contained within said substantially enclosed container wherein in a first position, said back of said first half and said front of said second half are a predetermined distance from each other due to the rubber material being substantially uncompressed within said substantially enclosed container and upon the introduction of a load to the front of said container, said resilient material is substantially compressed by the load moving the halves towards one another, thereby substantially absorbing the shock of the load, preferably said loading dock bumper further comprises a substantially chamfered edge proximate at least one side thereof, preferably said loading dock bumper further comprises at least one vehicle positioning indicia.

In yet another aspect of the invention, a method of manufacture of a loading dock bumper for use with a loading dock, said loading dock bumper comprising:

(i) a substantially enclosed container comprising a first half, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon, preferably said loading dock bumper further comprises a collar connecting said at least one substantially elongated aperture with said at least another substantially elongated aperture, (ii) a second half substantially larger than said first half, said second half having a front, and four sides extending substantially normal to said front, at least one aperture located at a predetermined position on one of said sides of said second half, and at least another aperture located at a predetermined position on one of the other sides of said second half opposed said side having said at least one aperture thereon, said second half and said apertures thereof matingly fitting over and aligning with said first half and the elongated apertures thereof proximate the sides thereof, forming a substantially enclosed hollow container, such that said elongated apertures of said first half and said apertures of said second half are substantially axially aligned with each other when the first and second halves are inter-fitted, (iii) a connecting device running through the apertures, connecting the first half with the second half, wherein said connection allows said first half and said second half to be substantially moveable with respect to each other, (iv) an effective amount of substantially compressible resilient material contained within said substantially enclosed container wherein in a first position, said back of said first half and said front of said second half are a predetermined distance from each other due to the rubber material being substantially uncompressed within said substantially enclosed container and upon the introduction of a load to the front of said container, said resilient material is substantially compressed by the load moving the halves towards one another, thereby substantially absorbing the shock of the load, wherein said method comprises:

(i) placing a predetermined effective amount of resilient material in said first half to an overfilled capacity, (ii) placing said second half under pressure over top of said first half aligning said elongated apertures of said first half and said apertures of said second half, (iii) sliding said at least one connecting device through the apertures connecting the first half with the second half, (iv) securing said at least one connecting device to said second half of said bumper, and (v) removing said pressure on said second half, preferably said loading dock bumper further comprises at least one vehicle position ing indicia.

In yet another aspect of the invention, a substantially open-faced loading dock bumper comprising:

(a) at least one resilient member;

(b) at least one resilient member support for supporting said at least one resilient member preferably said at least one resilient member support is at least one bracket;

(c) at least one resilient member wear indicator proximate said at least one resilient member, preferably said at least one resilient member is a plurality of resilient members, preferably the plurality of resilient members are substantially arranged face-to-face in a substantially stacked relationship, preferably said wear indicator is integral with said at least one resilient member; and (d) at least one mounting element for mounting said bumper to said loading dock, preferably said at least one mounting element is integral with said at least one resilient member support, preferably said bumper further comprising at least one vehicle positioning indicia, preferably in one embodiment, said at least one vehicle positioning indicia is integral with said at least one resilient member wear indicator, preferably said at least one vehicle positioning indicia is of a substantially reflective media, preferably said vehicle positioning indicia is integral with said at least one resilient member wear indicator, and preferably in another embodiment said at least one resilient member comprising said wear indicator having at least a first portion of a first indicia and at least a second portion of a second indicia proximate said first portion.

In yet another aspect of the invention, a substantially open-faced loading dock bumper comprising:

(i) a plurality of resilient members, substantially arranged face-to-face in a substantially stacked relationship, said stack having at least two outer face ends, said members having at least one aperture located at a predetermined position on each member;

(ii) a pair of brackets made of a substantially non-resilient material, each of said pair of brackets abut the outer face ends of the stack, said pair of brackets having at least one aperture located at a predetermined position on the first bracket of said pair of brackets, and at least another aperture located at a predetermined position on the second bracket of said pair of brackets;

(iii) at least one mounting element made of a substantially non-resilient material, said mounting element having a front, a back and two sides, and at least one connecting aperture located at a predetermined position on one of said sides, and at least another connecting aperture located at a predetermined position on one of the other sides opposed said side having said at least one connecting aperture thereon, at least one mounting aperture located at a predetermined position on said front, and at least another mounting aperture located at a predetermined position on said back opposed said front having said at least one mounting aperture thereon;

(iv) at least one connecting member made of a substantially non-resilient material, said connecting member extending through said at least one aperture of said resilient members and through said at least one connecting aperture of said mounting element, connecting the first and second brackets of said pair of brackets through said at least one aperture of said pair of brackets, such that said connection retains said resilient members and said mounting elements clamped in a substantially compressed mode between said pair of brackets as an integral unit;

(v) at least one vehicle positioning indicia made of a substantially reflective media;

(vi) at least one resilient member wear indicator proximate said plurality of said resilient members.

In yet another aspect of the invention, a method of manufacture of a substantially open-faced loading dock bumper for use with a loading dock, said loading dock bumper comprising:

(i) a plurality of resilient members, substantially arranged face-to-face in a substantially stacked relationship, said stack having at least two outer face ends, said members having at least one aperture located at a predetermined position on each member;

(ii) a pair of brackets made of a substantially non-resilient material, each of said pair of brackets abut the outer face ends of the stack, said pair of brackets having at least one aperture located at a predetermined position on the first bracket of said pair of brackets, and at least another aperture located at a predetermined position on the second bracket of said pair of brackets;

(iii) at least one mounting element made of a substantially non-resilient material, said mounting element having a front, a back and two sides, and at least one connecting aperture located at a predetermined position on one of said sides, and at least another connecting aperture located at a predetermined position on one of the other sides opposed said side having said at least one connecting aperture thereon, at least one mounting aperture located at a predetermined position on said front, and at least another mounting aperture located at a predetermined position on said back opposed said front having said at least one mounting aperture thereon;

(iv) at least one connecting member made of a substantially non-resilient material, said connecting member extending through said at least one aperture of said resilient members and through said at least one connecting aperture of said mounting element, connecting the first and second brackets of said pair of brackets through said at least one aperture of said pair of brackets, such that said connection retains said resilient members and said mounting elements clamped in a substantially compressed mode between said pair of brackets as an integral unit;

(v) at least one vehicle positioning indicia made of a substantially reflective media;

(vi) at least one resilient member wear indicator proximate said plurality of said resilient members, wherein said method comprises:

(i) arranging said at least one mounting element at a predetermined position proximate said stack of resilient members, (ii) placing said pair of brackets adjacent said outer face ends of said stack, to align said at least one connecting aperture, with said at least one aperture of said resilient members with said at least one aperture of said pair of brackets, (iii) sliding said at least one connecting member through said at least one aperture of said pair of brackets, through said at least one aperture of said resilient members and through said at least one connecting aperture of said mounting elements, (iv) securing said at least one connecting member to said bumper, and (v) attaching said at least one vehicle positioning indicia to said bumper.

In any of the above embodiments, the loading dock bumper preferably further comprises at least one substantially chamfered edge.

In any of the above embodiments, the at least one resilient member wear indicator is preferably integral with said at least one resilient member. Yet still in any of the above embodiments, the at least one resilient member preferably has at least a first portion of a first indicia and at least a second portion of a second indicia proximate said first portion.

In any of the above embodiments, said at least one mounting element is preferably integral with said at least one resilient member support.

In any of the above embodiments, the loading dock bumper further comprises at least one resilient member wear indicator proximate said at least one resilient member.

In any of the above embodiments, said at least one vehicle positioning indicia is preferably integral with the at least one resilient member wear indicator.

In any of the above embodiments, the at least one resilient member is preferably a plurality of resilient members, preferably substantially arranged face-to-face in a substantially stacked relationship.

In any of the above embodiments, the at least one resilient member support is preferably at least one bracket made from a non-resilient material.

In any of the above embodiments, the vehicle positioning indicia is preferably integral with said at least one resilient member wear indicator.

In any of the above embodiments, the resilient material may include but is not limited to a spring, foam, crumb rubber from waste tires, scrap laminate rubber, or a combination of the above.

In any of the above embodiments, the non-resilient material is a metal, preferably carbon steel or the like.

In any of the above embodiments, the vehicle positioning indicia is preferably made of a substantially reflective media, preferably, a reflective strip and is preferably substantially recessed from where the load is introduced.

BRIEF DESCRIPTION OF THE DRAWINGS

The following figures illustrate preferred and alternative embodiments of the invention, wherein:

FIG. 1 is a top sectional view of the present invention in an unloaded state in a preferred embodiment.

FIG. 2 is a top sectional view of the present invention in a loaded state in a preferred embodiment.

FIG. 9 is a top sectional view of the present invention in another embodiment.

DETAILED DESCRIPTION OF THE DRAWINGS

Referring to FIGS. 1 through 9, there is provided a loading dock bumper generally designated as 10 having a first shell 20 and a second shell 30, where the first shell 20 is smaller than the second shell 30, in order for the second shell 30 to snugly fit over the first shell 20.

Figure 3:
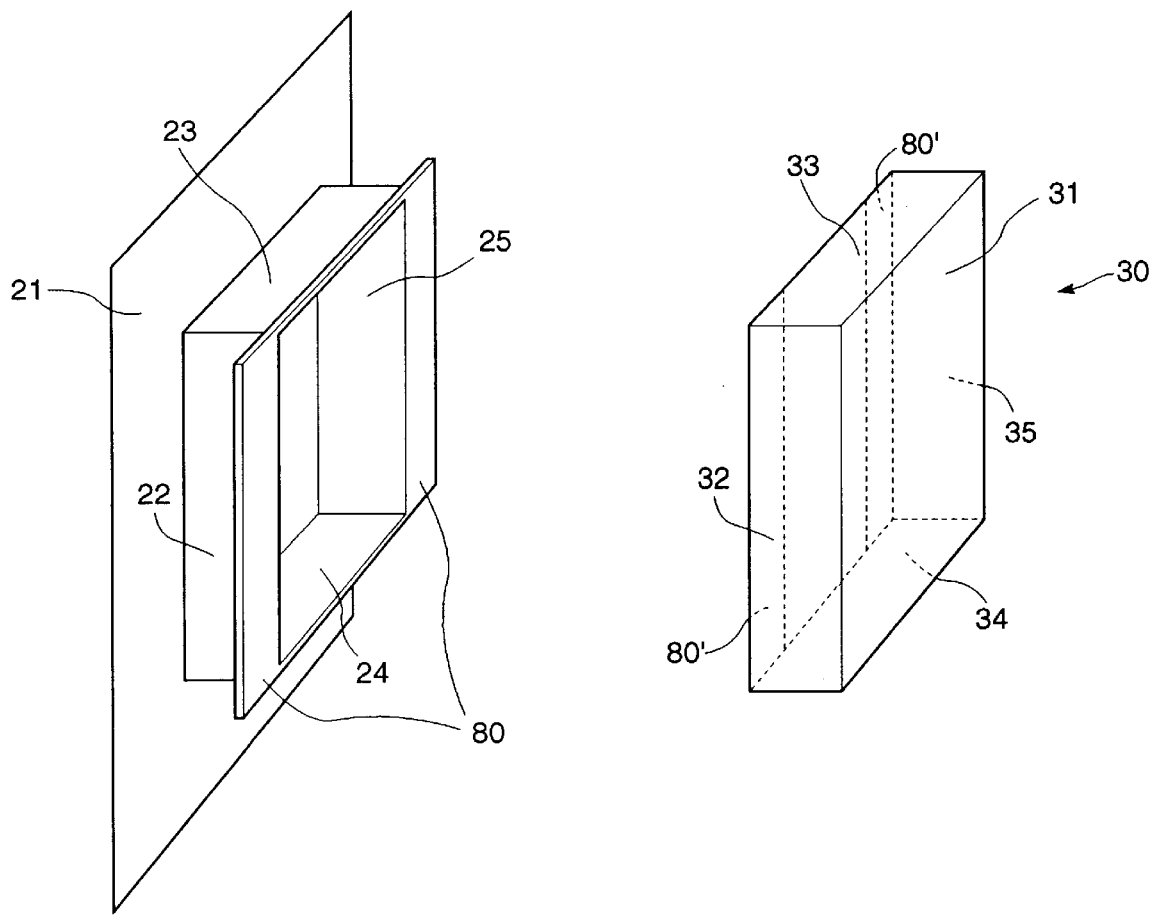
FIG. 3 is an exploded view of the present invention in a preferred embodiment.
Figure 4:
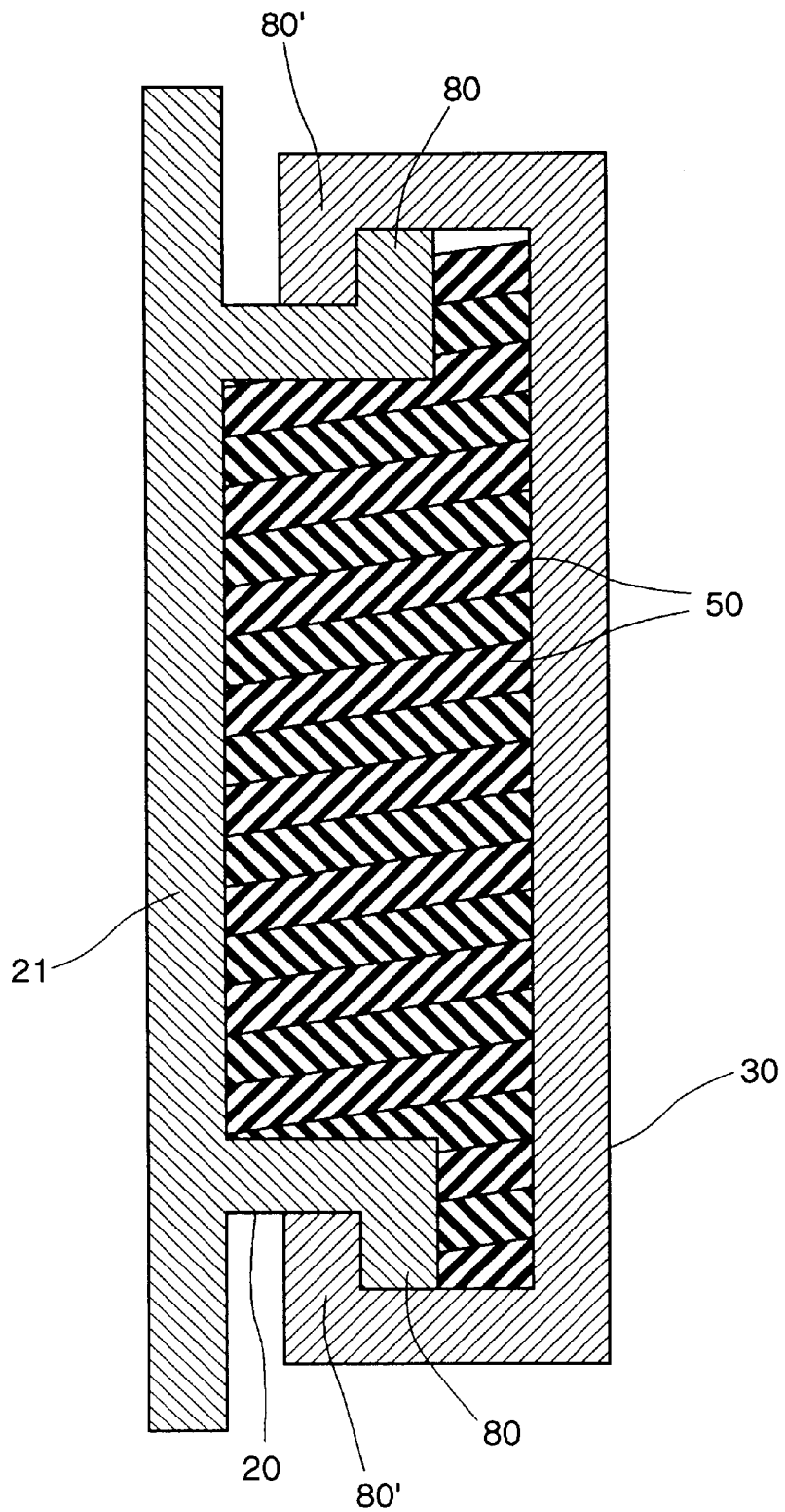
FIG. 4 is a top sectional view of the present invention in another embodiment.

The first shell 20 has a back plate 21 and four sides 22, 23, 24, 25 projecting substantially normal to said back plate 21 as best seen in FIGS. 4 and 5. Sides 22 and 25 are substantially parallel to each other, as are sides 23 and 24 substantially parallel to each other.

The second shell 30, has a front plate 31 and four sides 32, 33, 34 and 35 projecting substantially normal to said front plate 31 as best seen in FIGS. 4 and 5. Sides 32 and 35 are substantially parallel to each other, as are sides 33 and 34 substantially parallel to each other.

Referring now specifically to FIGS. 1 through 6C, in one embodiment, each side 22 and 25 of the first shell 20, have a pair of flanges 80 located on the outer portion of sides 22 and 25 as best seen in FIG. 4. Each side 32 and 35 of the second shell 30 have a pair of flanges 80' located on the inner portion of the sides 32 and 35 as best seen in FIG. 5.

The first shell 20 and the second shell 30 are kept together by the two pairs of flanges 80 and 80', preferably made of carbon steel or the like as best seen in FIGS. 1, 2 and 4.

In this embodiment, the second shell 30 fits over the first shell 20 such that the sides with the flanges of each shell are placed over each other, aligning same. Prior to placing the second shell 30 over the first shell 20, a predetermined effective amount of resilient material, in this embodiment, layers of laminate rubber 50 are placed in the first shell 20 in an overfilled capacity, and under pressure, the front plate 31 of the second shell 30 is placed on top of the first shell 20, and the sides 32 and 35 with the flanges 80', are attached for example, by welding to the front plate 31 of second shell 30 as best seen in FIG. 4, to align the two pairs of flanges 80 and 80' in order to movably connect the first shell 20 and the second shell 30. When the pressure on the second shell 30 is removed, the resiliency of the laminate rubber 50 causes the first shell 20 and the second shell 30 to move away from each other. The sides 33 and 34 of the second shell 30 are then attached for example, by welding to the front plate 31 while maintaining the bumper 10 substantially enclosed.

The back plate 21 of the first shell 20 is also a mounting plate to mount the loading dock bumper to the loading dock, as can be seen in FIGS. 1 and 2. In FIG. 1 the loading dock bumper is in the "rest" or unloaded position, since there is no external force urging the second shell 30 toward the first shell 20. But as can be seen in FIG. 2, a truck 60 backing up to the loading dock 70 with the loading dock bumper 10 in place, (the truck 60 moving against the bumper 10) urges the second shell 30 to said first shell 20 compressing the laminate rubber 50 contained therein and thus absorbing and/or reducing the shock of said truck 60 against the loading dock 70. In this embodiment, the layers of laminate rubber 50 are placed horizontally in the first shell 20 in an overfilled capacity. However, in another embodiment, the layers of laminate rubber 50 are placed vertically in the first shell 20 in an overfilled capacity as best seen in FIG. 4.

Figure 5A:
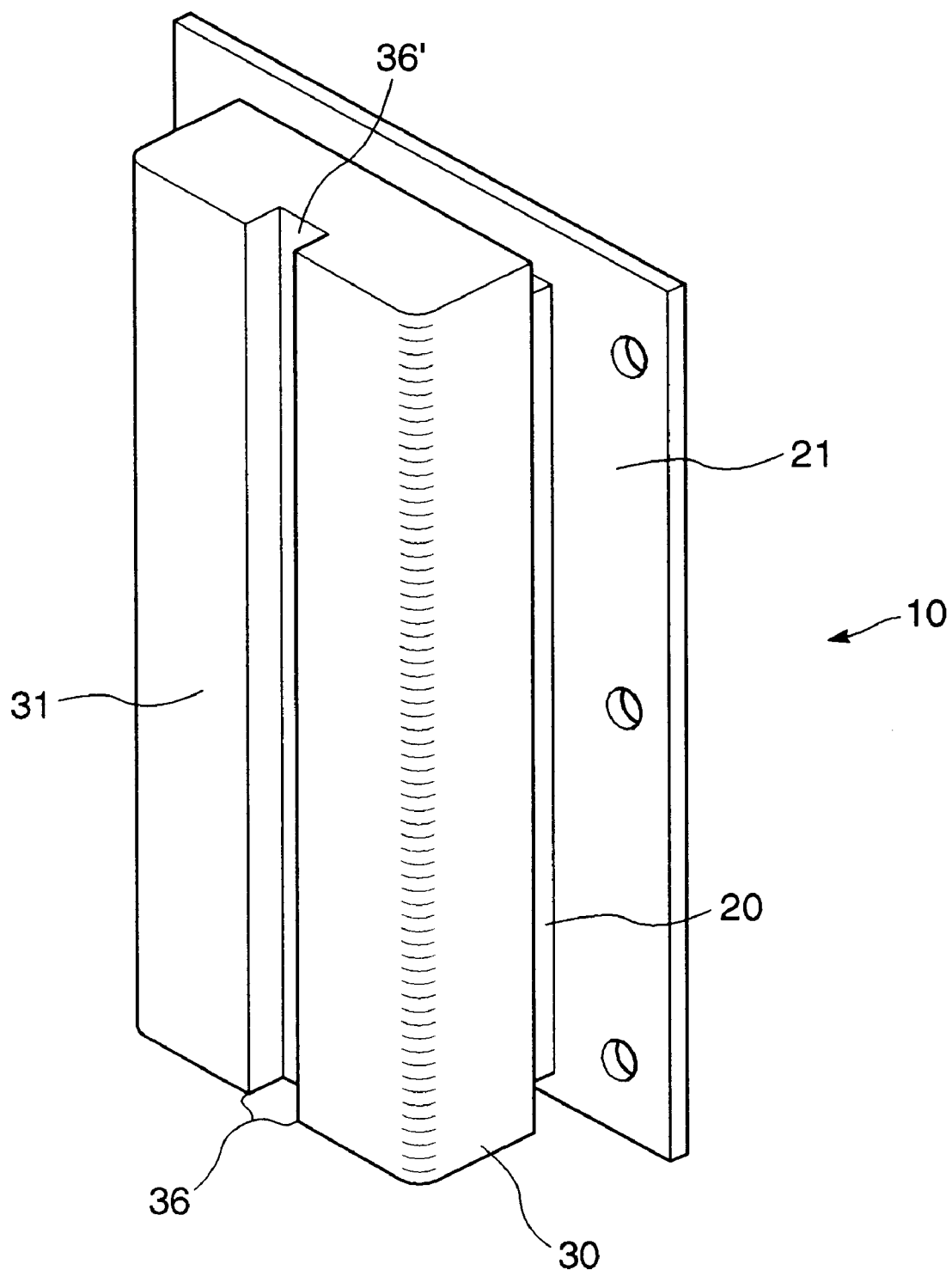
FIG. 5A is a front view of the present invention in another embodiment.
Figure 5B:
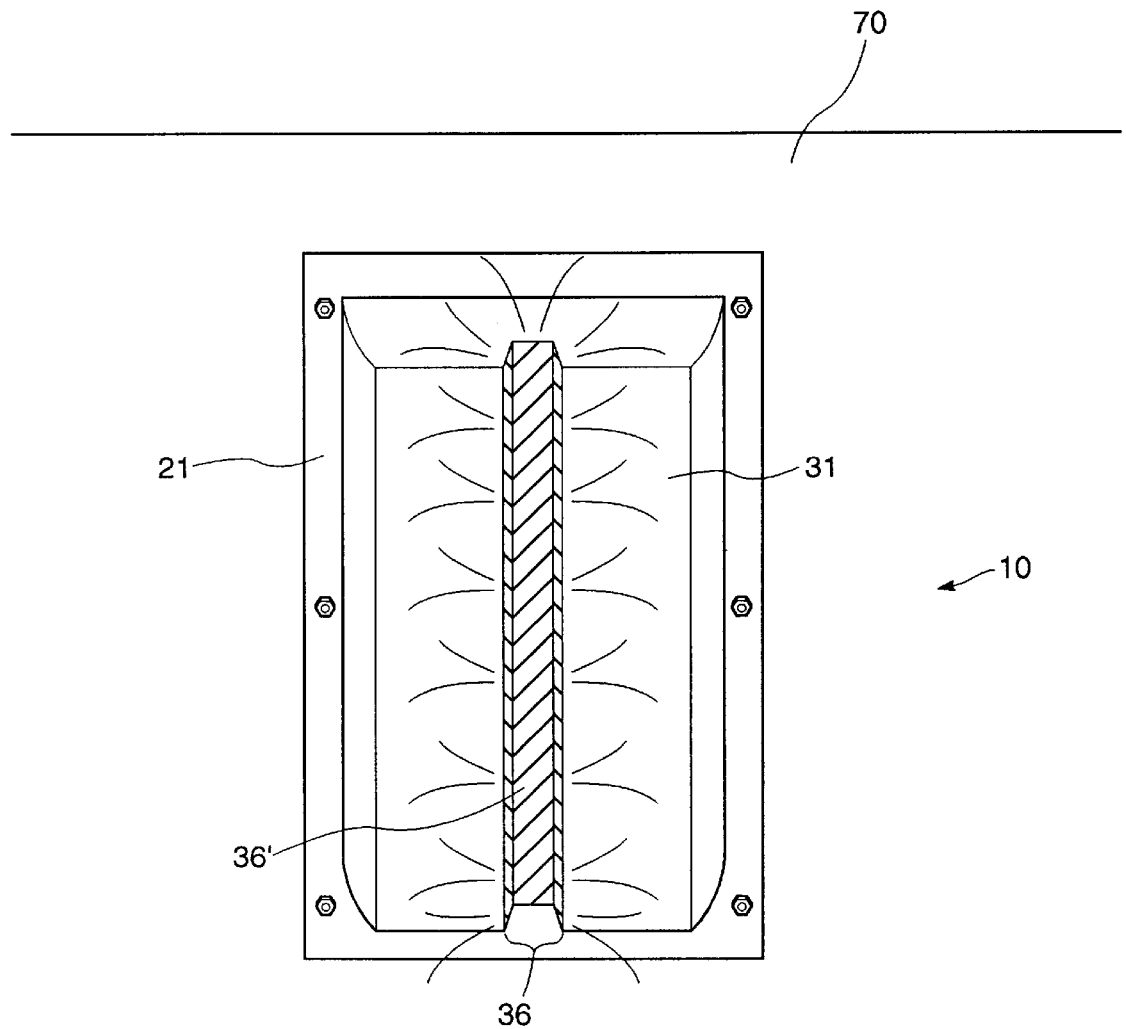
FIG. 5B is a front view of FIG. 5A when in use.

In another embodiment, as best seen in FIGS. 5A and 5B, the bumper structure is similar to the embodiment shown in FIGS. 1, 2, 3 and 4, except that the bumper comprises a vehicle positioning indicia 36'. In this instance, the front plate 31 of the second shell 30 has a recess 36, the form and dimensions of which may vary depending on design requirements and preference, forming the vehicle positioning indicia 36'. In this embodiment, the recess 36 is in the form of an "A channel". It will be evident however, that the recess 36 could be of various forms such as a "V groove". While the recess may be formed in different dimensions, as previously mentioned, in a typical case, the recess is 1 ½ inches wide and 1 inch deep. Creating the channel via welding the components together, or simply stamping or forming the channel with techniques well known to people in the field is acceptable. Indicia 36' suitable for use in this embodiment include reflective media such as substantially reflective or fluorescent strips and substantially reflective or fluorescent paint or coatings. Suitable reflective media such as Reflectix Double Bubble Foil by Reflectix can be used. Upon positioning the truck (not shown) at the loading dock 70 for loading or unloading, the brakes are applied activating the brake lights. However, the light rays are not intercepted by the vehicle positioning indicia 36' until the vehicle reaches the proper location. When light rays from the brake lights are reflected by the vehicle positioning indicia 36' and visibly seen by the operator through the side view mirror, this signifies that the vehicle is traveling along the desired pathway towards the loading dock. The vehicle positioning indicia 36' facilitates the operator to accurately guide the truck along a longitudinal pathway, bringing it to a defined position in relationship to the loading dock to facilitate loading and unloading as best seen in FIG. 5B. While the operator is positioning the vehicle at the loading dock, the operator can visually see the progress of vehicle movement by use of the side view mirror. The side of the vehicle will be viewed as the rear end approaches the loading dock, all the while a bright glow from the reflection of the brake lights in the vehicle positioning indicia 36' appears in the side view mirror signaling that the vehicle is traveling along the predetermined pathway to arrive at the proper location. During night or daylight conditions, the brake lights are sufficiently bright to provide visual images to the operator.

Figure 6A:
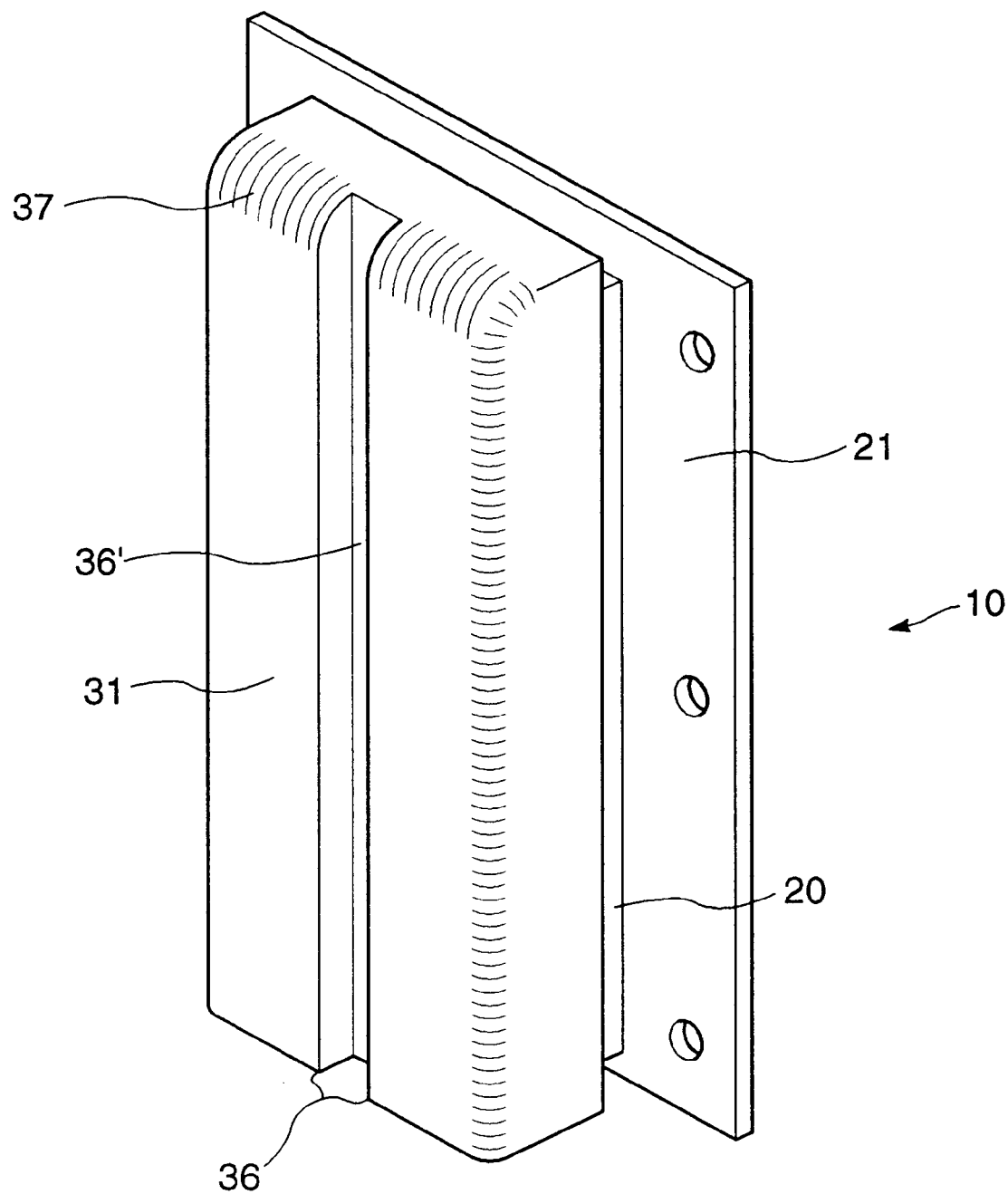
FIG. 6A is a perspective view of the present invention in another embodiment.
Figure 6B:
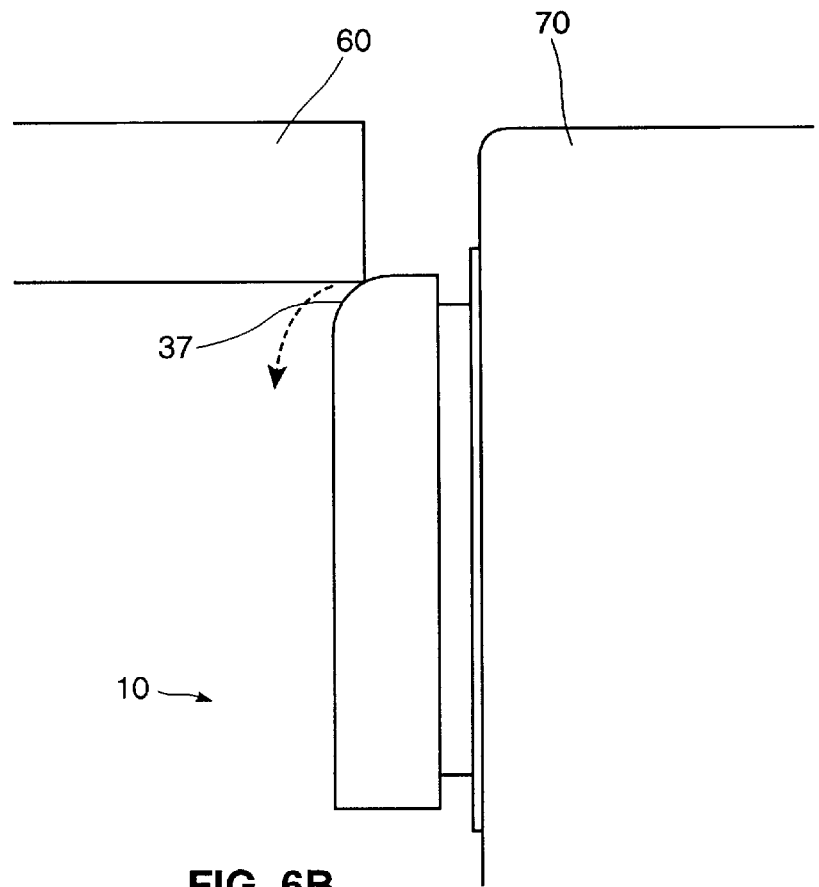
FIG. 6B is a side view of FIG. 6A when in use.
Figure 6C:
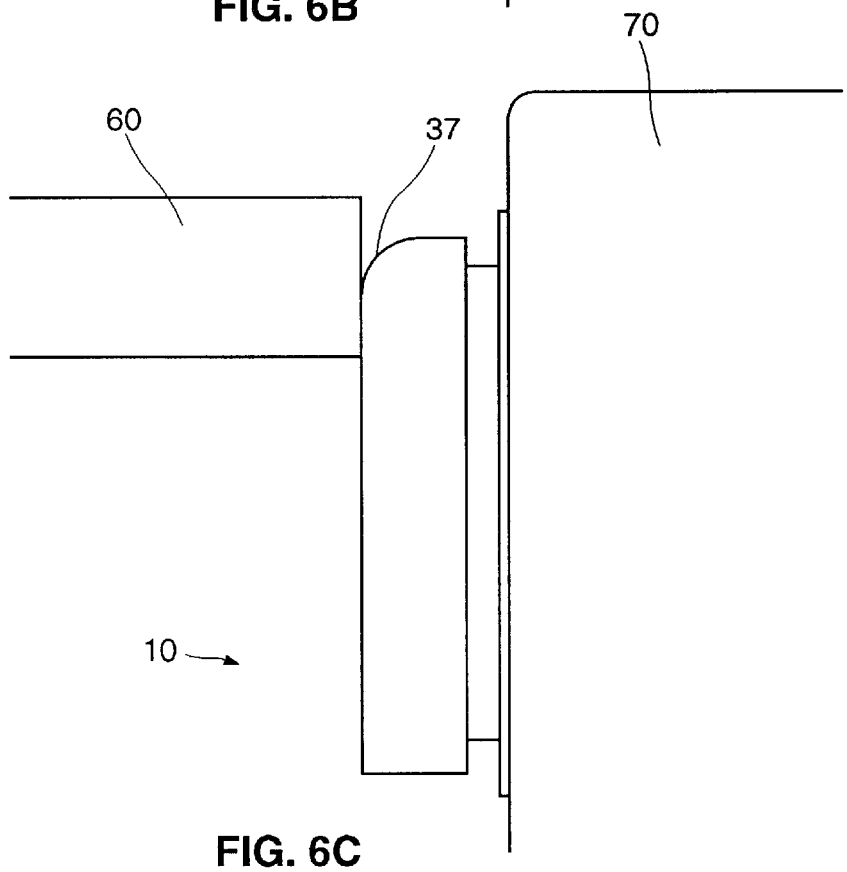
FIG. 6C is a side view of FIG. 6A when in use.

In another embodiment, as best seen in FIG. 6A, the bumper structure is similar to the embodiment shown in FIGS. 5A and 5B except that the bumper 10 further comprises a chamfered edge 37. In this instance, the second shell 30 has a 45° chamfered edge 37 formed using the front plate 31 and three of the sides of the second shell 30. Furthermore, upon the loading and/or unloading of the truck at the loading dock, a fork lift (not shown) will ride into the truck from the warehouse to pick-up (drop off) a load and return to the warehouse. The chamfered edge 37 on the loading dock bumper will prevent premature damage to fork-lift forks and tires. As well, during loading, the extra weight of the load and of the fork lift moving onto the truck will cause the truck's bumper 60 to get caught up on the loading dock bumper, but due to the chamfered edge 37, of the present invention, the truck's bumper 60 just slides off the top of the loading dock bumper, thus preventing problems during disengagement from the loading dock as best seen in FIGS. 6B and 6C.

Figure 7:
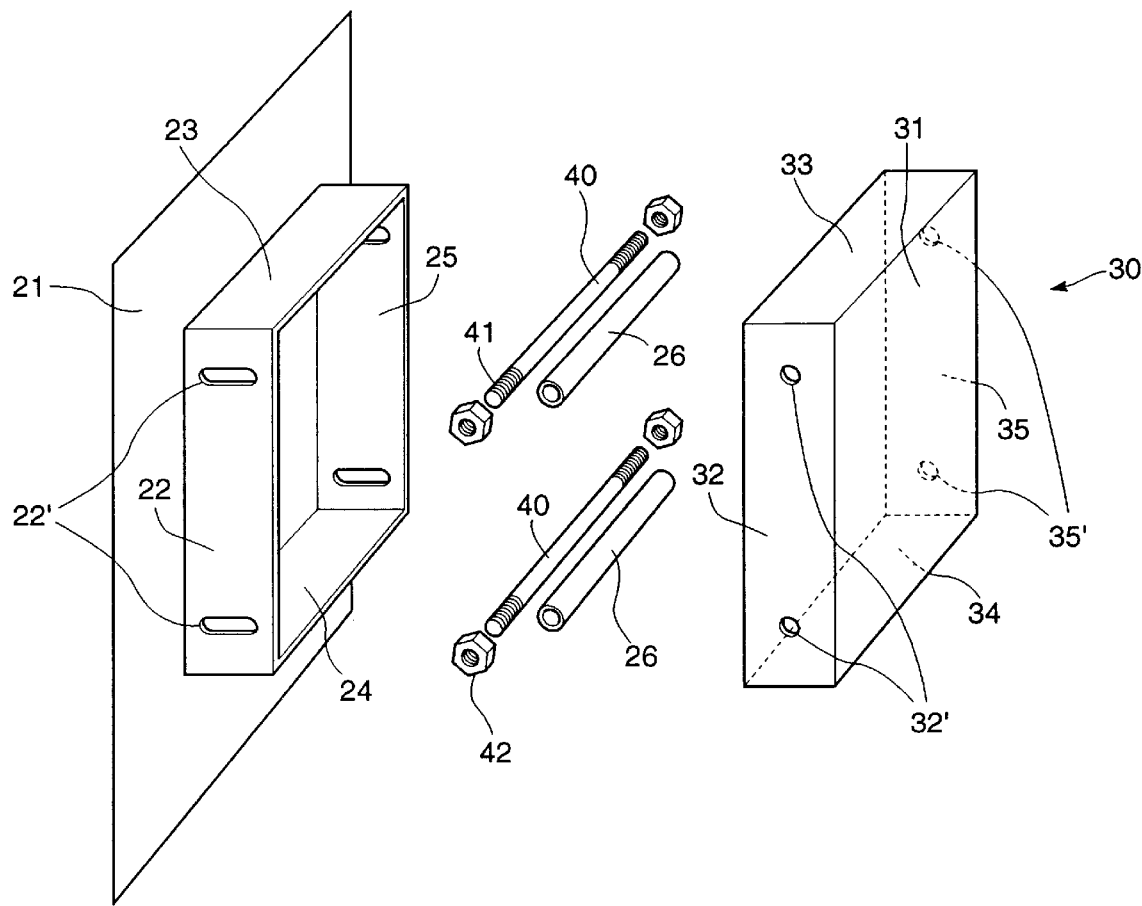
FIG. 7 is an exploded view of the present invention in another embodiment.
Figure 8:
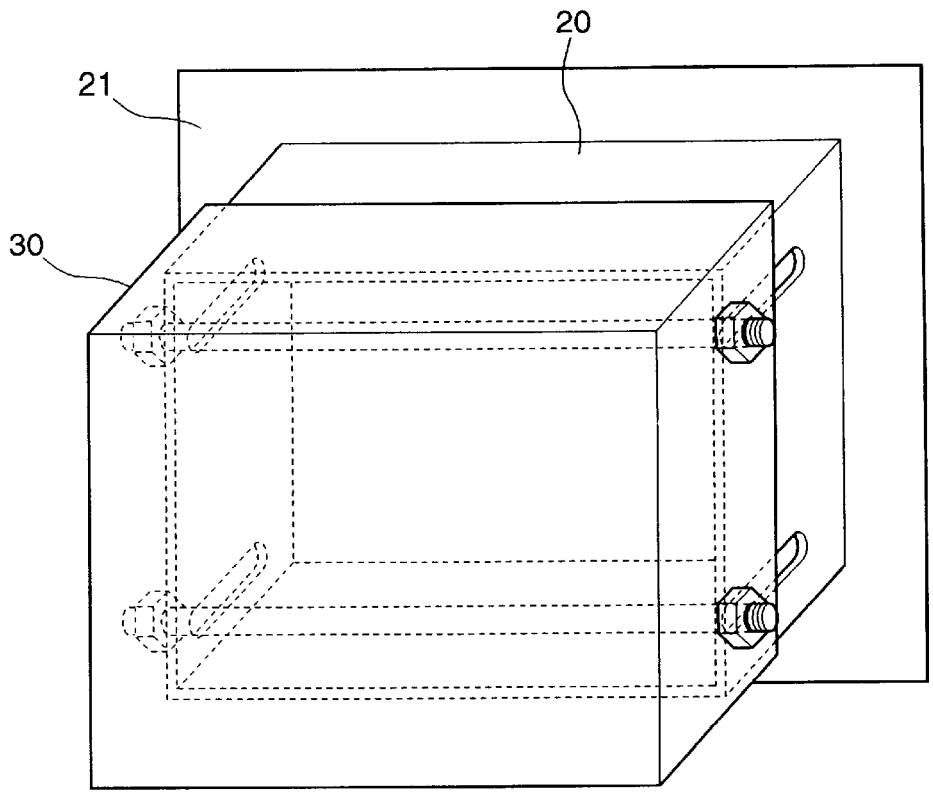
FIG. 8 is a front view of FIG. 7 in an unloaded state.
Figure 9:
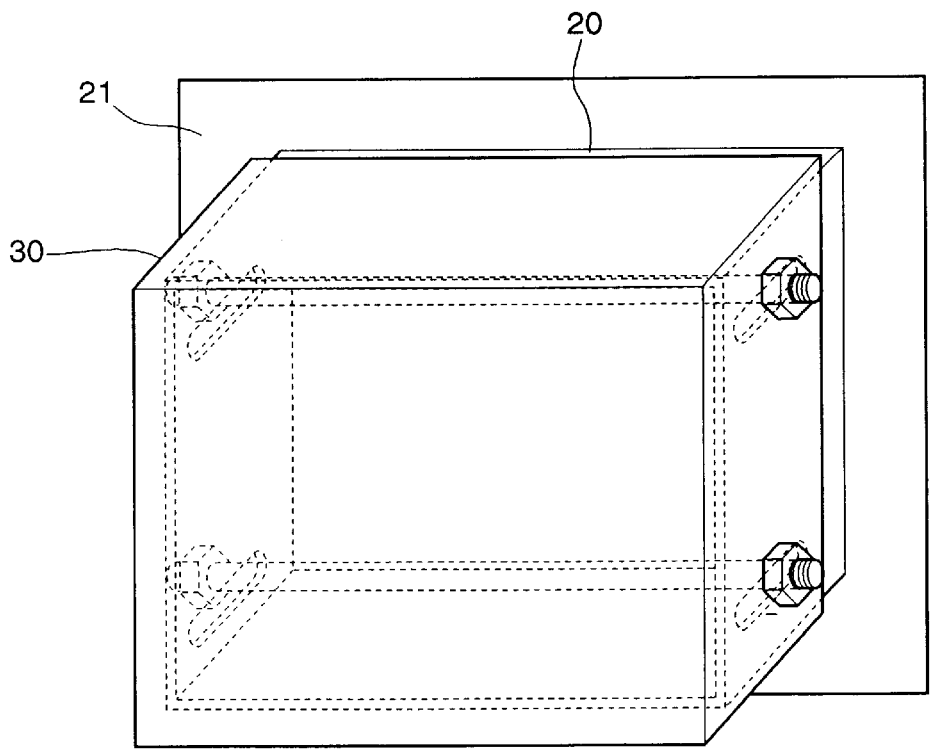
FIG. 9 is a front view of FIG. 7 in a loaded state.

In another embodiment, as best seen in FIGS. 7, 8 and 9 there is shown the loading dock bumper 10 without the need of the flanges 80 and 80'. In this instance, the first shell 20 and second shell 30 are connected to each other via a pair of connecting rods 40 threaded at the ends thereof 41 and each rod is held in place by a pair of nuts 42 threaded onto said threaded ends 41. Each side 22 and 25 of the first shell 20 have respectively a pair of axially aligned substantially elongated apertures 22' and 25' respectively thereon. Furthermore, sides 22 and 25 have running along the interior of the shell formed by the four sides 22, 23, 24 and 25, and between each pair of substantially elongated apertures 22' and 25' a protective collar 26. Each side 32 and 35 of the second shell 30 have respectively a pair of axially aligned apertures 32' and 35' respectively thereon.

In this embodiment, the second shell 30 fits over the first shell 20 such that the sides with the apertures of each are placed over each other, aligning same. The second shell 30 is placed under pressure over top of the first shell 20 to align the pairs of apertures 22' with 32' and 25' with 35' with the first shell 20 over filled with a predetermined effective amount of laminate rubber 50 and then the connecting rods 40 are slid through the apertures 22', 32', 25', 35' in order to movably connect the first shell 20 and the second shell 30.

Similarly the loading dock bumper of this embodiment operates as per FIGS. 1 and 2 in the unloaded and loaded states respectively as can be seen in FIGS. 8 and 9.

Figure 10:
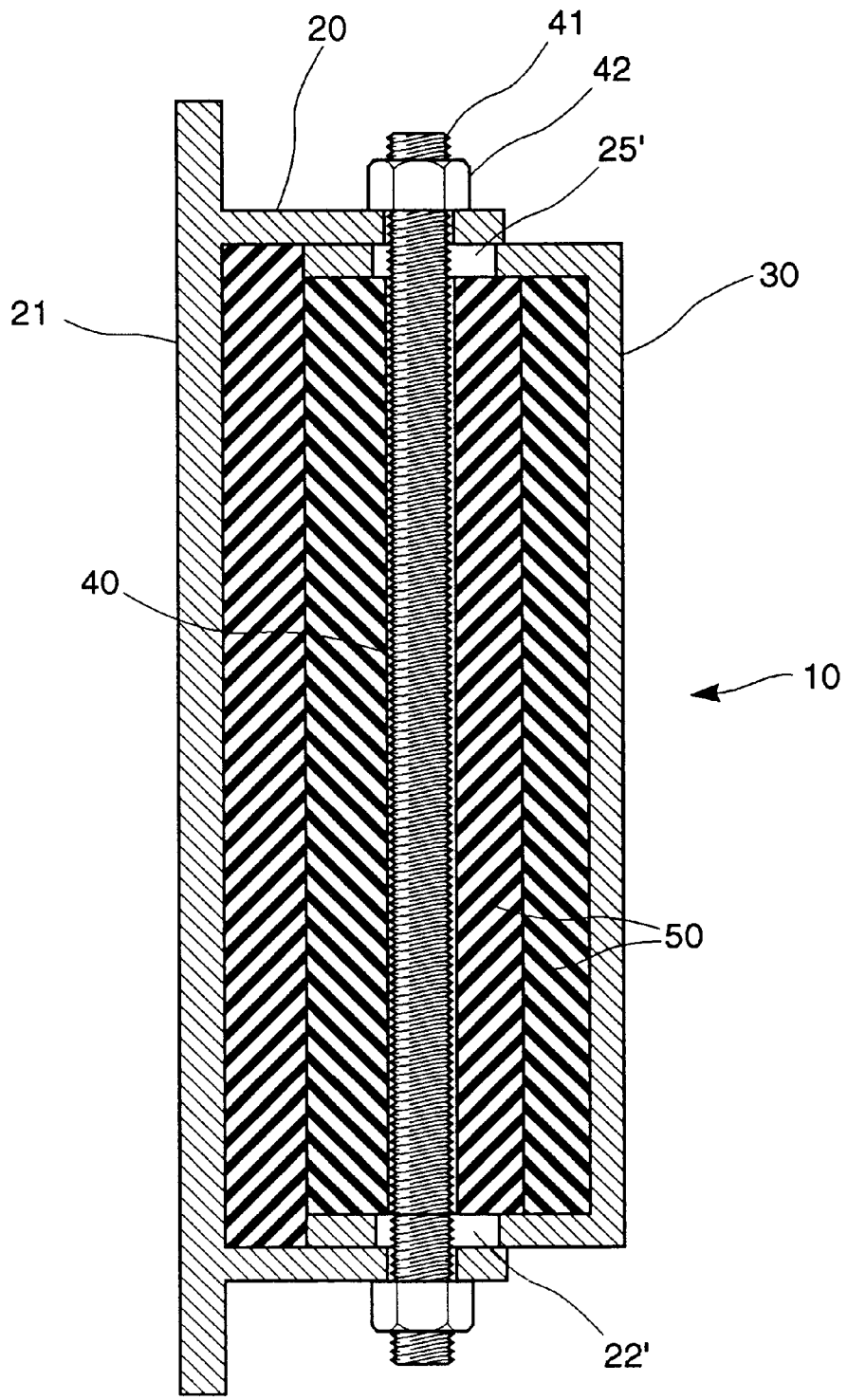
FIG. 10 is top sectional view of the present invention in another embodiment.

In another embodiment, as best seen in FIG. 10, the bumper structure is similar to the embodiment shown in FIGS. 7, 8 and 9, except that the second shell 30 is smaller than the first shell 20, in order for the second shell 30 to snugly fit into the first shell 20. Although connecting members 40 are shown in this embodiment, flanges such as those shown in FIGS. 1, 2, 3 and 4, could replace the connecting members 40 as a means to movably connect the first shell 20 and the second shell 30.

In any of the above embodiments, upon the loading and/or unloading of the truck at the loading dock, a commonly used fork-lift (not shown) will ride into the truck from the warehouse to pick-up (or drop off) a load and return to the warehouse. The extra weight of the fork lift moving onto and out of the truck will cause the truck's bumper, to move substantially horizontally against the loading dock bumper, but due to the resiliency of the laminate rubber, and the structural integrity of the shells, there is substantially no damage encountered by the loading dock bumper of the present invention, due to the movement of the truck bumper or the like against the loading dock bumper.

Figure 11:
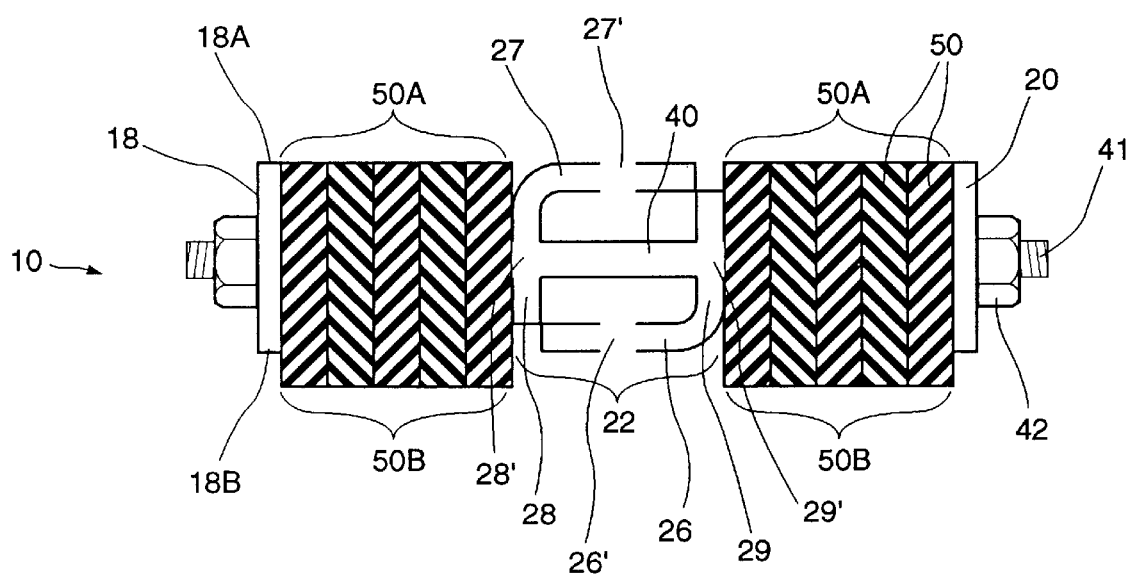
FIG. 11 is a top sectional view of the present invention in another embodiment.
Figure 12:
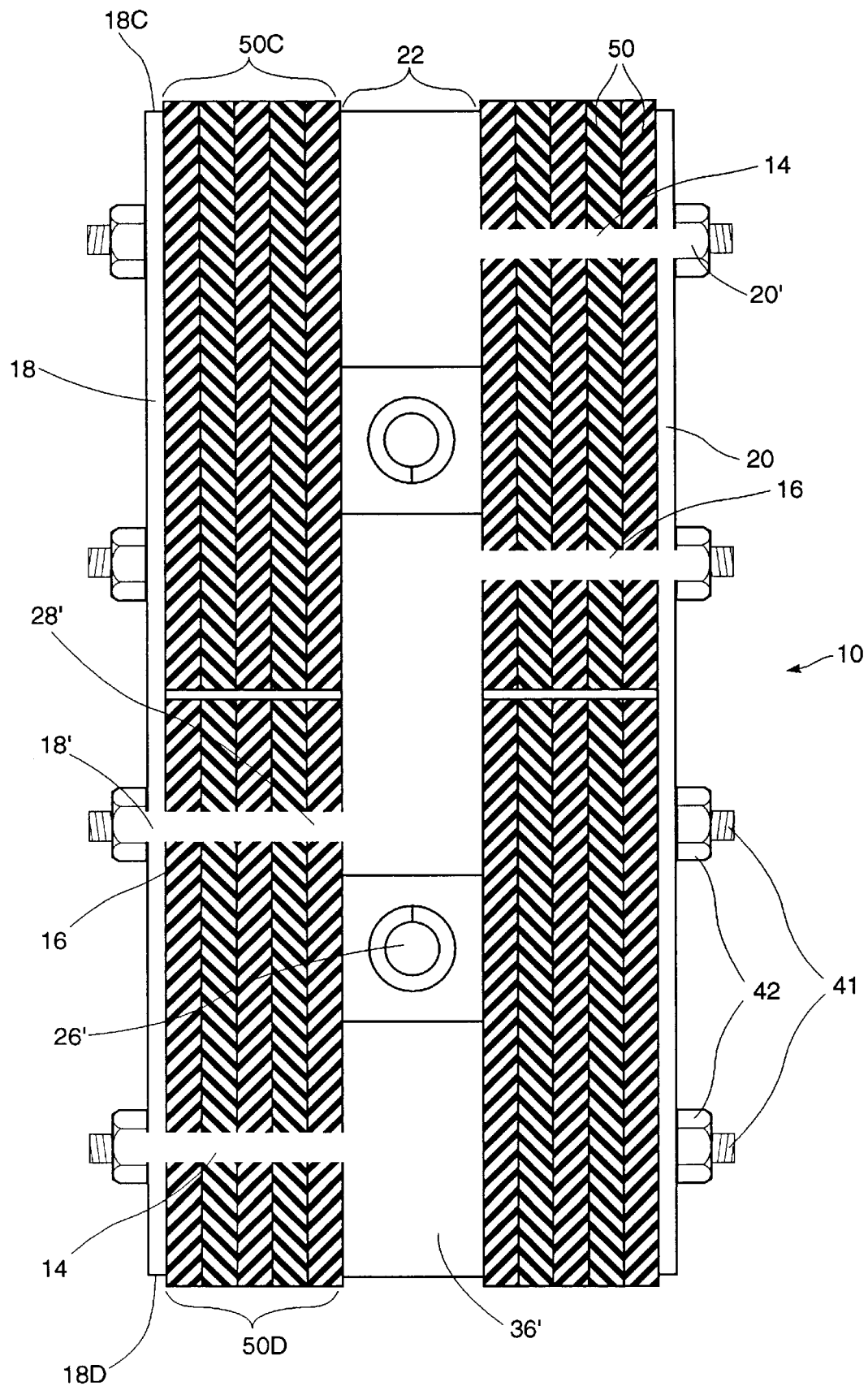
FIG. 12 is a front view of FIG. 11.
Figure 13:
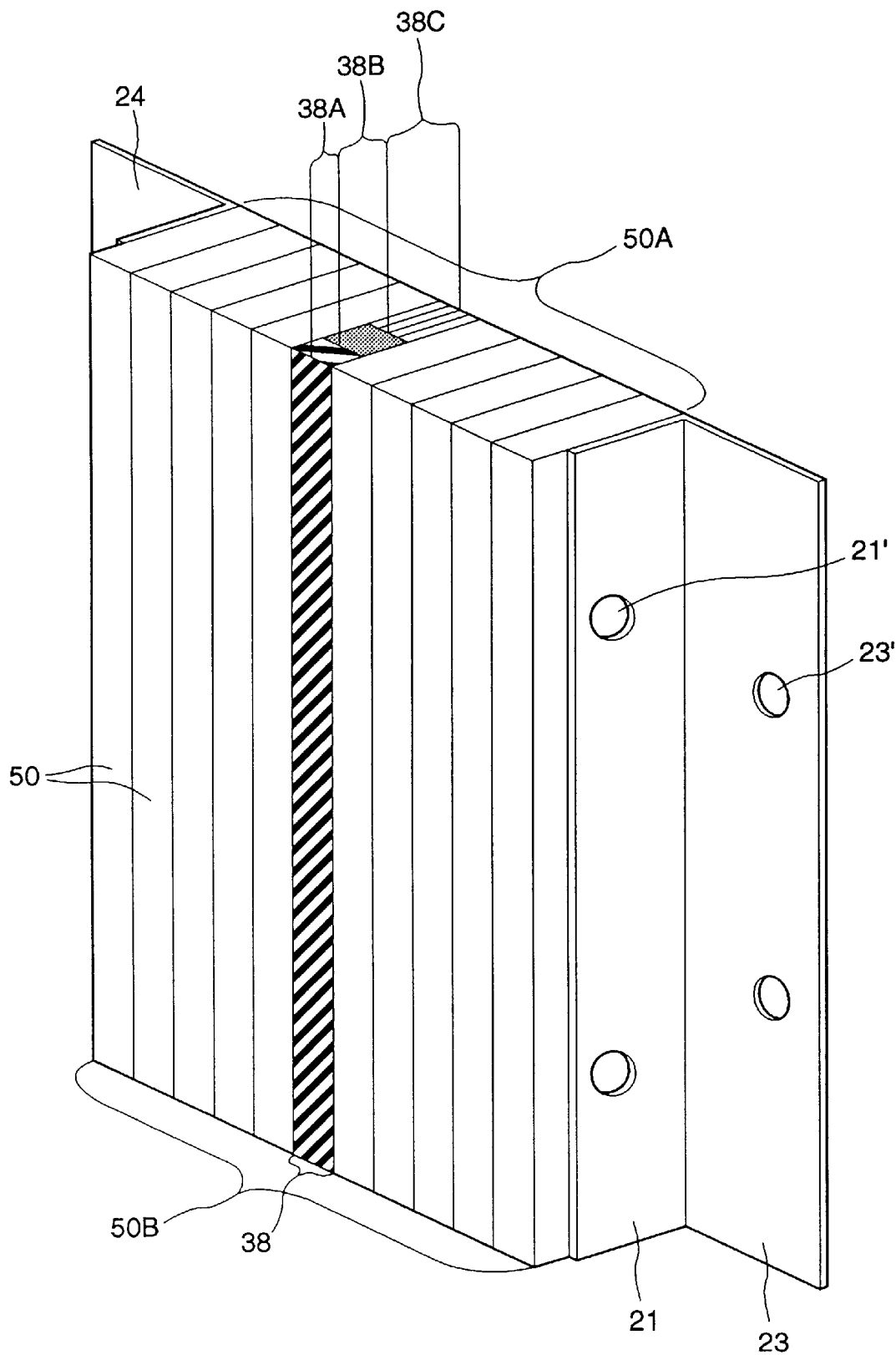
FIG. 13 is a perspective view of the present invention in another embodiment.
Figure 13A:
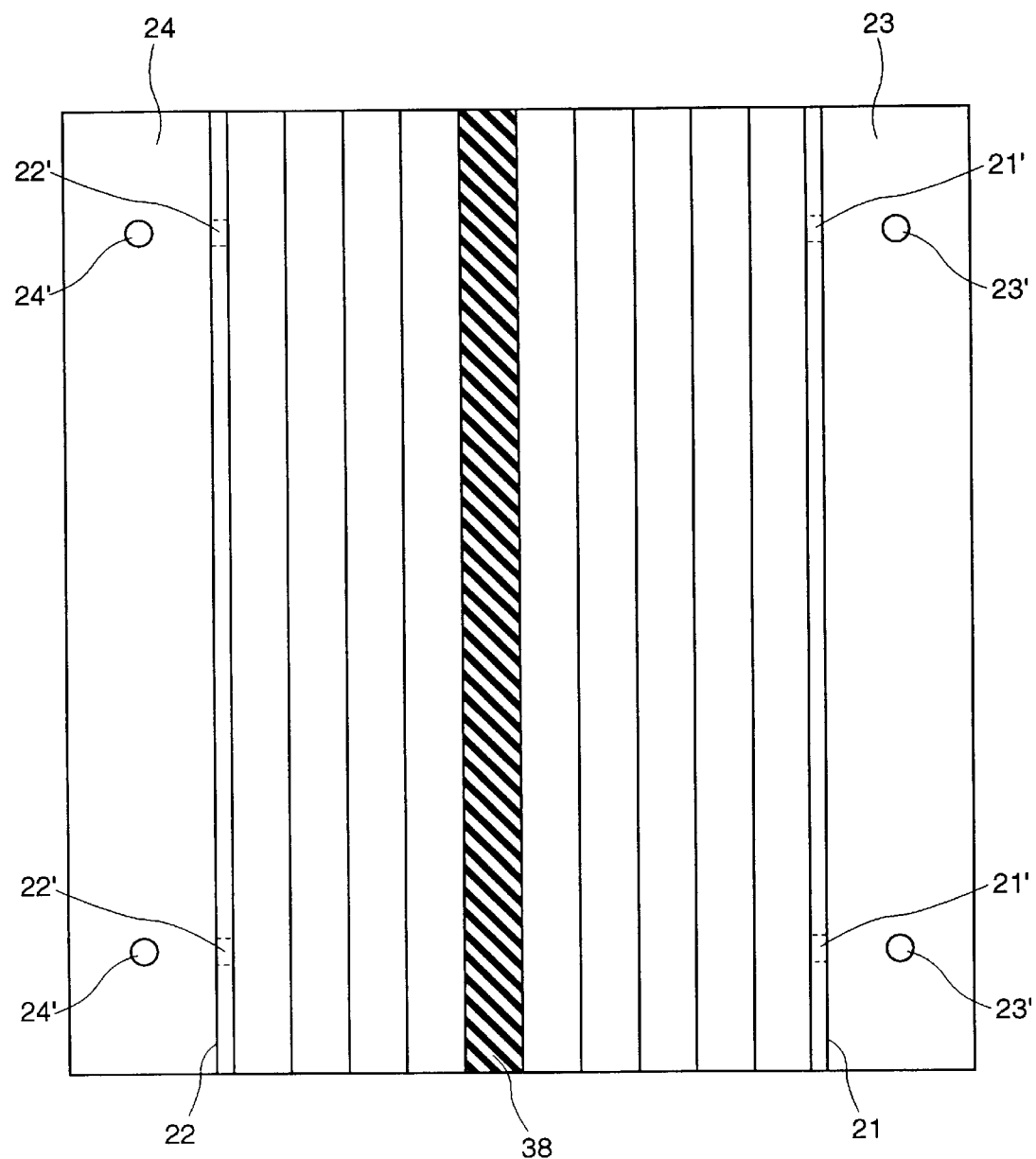

In yet another embodiment, as best seen in FIGS. 11 and 12, there is shown a substantially open-faced loading dock bumper designated as 10 comprising a plurality of individually and substantially rectangular members 50 of resilient material, in this embodiment, laminate scrap rubber sheets such as that removed from vehicle tires. Such sheets are arranged face-to-face in a stack, the dimensions of which may vary depending upon design requirements or preference.

The stack of resilient members 50 constitutes the body of the bumper. Each of the many individual resilient members 50 are apertured, in this embodiment, each individual unit is provided with two apertures 14 and 16, as by drilling or cutting or punching or otherwise. All of the members 50 are substantially the same size and shape preferably and the two apertures 14 and 16 located substantially in the same position on each so that when placed in a stack, aperture 14 aligns with all of the other apertures 14 and aperture 16 aligns with all of the other apertures 16 and provides longitudinal openings through all of the stacks of like members 50. Such members 50 are clamped together in the stack between a pair of brackets 18 and 20 and a mounting element 22 by connecting members 40, threaded at the ends 41 thereof and each member 40 is held in place by a pair of nuts 42 threaded onto said threaded ends 41.

In this embodiment, the mounting element 22 is a hollow steel bar having a front 26, a back 27 and two sides 28 and 29 projecting substantially normal to said front 26 and said back 27. Each side 28 and 29 have respectively four axially aligned apertures 28' and 29' respectively thereon. The front 26 and the back 27 have respectively a pair of axially aligned apertures 26' and 27' respectively thereon. Each bracket 18 and 20 have respectively four axially aligned apertures 18' and 20' respectively thereon. The connecting members 40 are in the form of parallel through-bolts which are inserted and which extend through the aligned apertures in the resilient members 50 and the aligned apertures in the mounting element 22 and which have their ends secured to and thus interconnect the pair of brackets 18 and 20. The brackets 18 and 20 function as end plates abutting the end members of the stack over a major portion of their area. In this embodiment, the brackets have their rear edges 18A flush with the rear face of the stack 50A and their top and bottom edges 18C and 18D respectively flush with the top and bottom faces of the stack 50C and 50D respectively, but the front edge 18B of the brackets are spaced rearwardly of the front face 50B of the stack so that the brackets 18 and 20 will not be damaged by a truck backing up against the bumper, nor will the brackets interfere with the resiliency of the bumper. The mounting element 22 functions to mount the bumper against a rigid surface, in this embodiment, the supporting wall of a loading dock (not shown). The mounting element 22 is preferably flush with the rear face of the stack 50A so that when the mounting element 22 is secured to the wall by bolts (not shown), such edges abut the wall surface. The mounting element 22 is recessed from the front edges 50B of the stacked members 50 so that the mounting element 22 does not interfere with the resiliency of the loading dock bumper.

The vehicle positioning indicia 36', in this embodiment, a reflective strip, is attached to the mounting element 22. The vehicle positioning indicia 36' is recessed from the front face 50B of the stack so that the vehicle positioning indicia 36' is protected from wear until the resilient members 50 are worn down to a level which is flush with the vehicle positioning indicia 36'. In this embodiment, the vehicle positioning indicia 36' further functions as a wear indicator 38 thus indicating that a substantial amount of resilient material has been worn away from the loading dock bumper, and that the resilient material of the loading dock bumper should be replaced in order to ensure safe use.

In the illustrated case, the connecting members 40 have threads 41 at the ends thereof. In such case, clamping pressure of the brackets 18 and 20 against the ends of the stack is exerted by tightening the retaining nuts 42 on the threaded ends 41 of the connecting members 40.

It will be evident however, that the connecting members 40 could take the form of through-rods having heads at one end and their opposite ends are welded to form heads (not shown) while the resilient members in the stack are held under sufficient clamping pressure between the brackets. Such pressure can be established by holding the assembly in a press or vise until the ends of the connecting members are appropriately welded onto the brackets to maintain the desired pressure. While four connecting members have been shown in the above embodiment, more or less connecting members may also be used, depending on the size of the loading dock bumper and the application thereof.

In yet another embodiment, as best seen in FIG. 11, there is shown a variation to the embodiment shown in FIG. 10. In this embodiment, each bracket 18 and 20 are angled and comprise clamping flanges 21 and 22 and mounting flanges 23 and 24. The clamping flanges 21 and 22 have respectively two axially aligned apertures 21' and 22' respectively thereon. The mounting flanges 23 and 24 have two apertures 23' and 24' thereon. The clamping flanges 21 and 22 function as end plates abutting the end members of the stack over a major portion of their area which consequently support the members against buckling when subjected to impacts. The mounting flanges 23 and 24 constitute mounting plates by which the loading dock bumper is mounted against a rigid surface, in this embodiment, the supporting wall of a loading dock (not shown). The mounting flanges 23 and 24 are preferably flush with the rear face of the stack 50A so that when the mounting flanges 23 and 24 are secured to the wall by bolts 26 (not shown), such face abuts the wall surface.

The wear indicator 38, in this embodiment, is one of the plurality of resilient members, which comprises a first portion 38A termed the "working zone", a second portion 38B termed the "caution zone" and a third portion 38C termed the "replacement zone". The first portion 38A of the wear indicator is the same colour as the remaining resilient members 50 in the stack and indicates the normal working function of the bumper. The second portion 38B of the wear indicator is a different colour from that of the first and third portions 38A and 38C respectively and indicates that a substantial amount of resilient material has been worn away from the bumper. The third portion 38C of the wear indicator is of a colour differing from the first and second portions 38A and 38B respectively and indicates that the bumper should be replaced.

In any of the above embodiments, the layering configuration of the laminate rubber can be substantially horizontal as shown in FIGS. 1 and 2, substantially vertical as shown in FIGS. 3, 9, 10, 11, 12 and 13 or a combination of both.

The preferred material in any of the embodiments depicting a substantially enclosed container is high carbon steel for the container, but any appropriate metal or any other effective material which can meet the requirements of the invention may be used. Furthermore, although laminate rubber is shown in these embodiments, any suitable resilient material may be used.

While the bumpers may be made in different sizes as previously mentioned, in a typical case, a substantially enclosed bumper unit is 12 inches long by 12 inches wide and 4 inches deep. In yet another typical case, an open-faced bumper unit is 20 inches long by 8 inches wide and 3 ¼ inches deep.

As many changes can be made to the preferred embodiments of the invention without departing form the scope of the invention; it is intended that all material contained herein be interpreted as illustrative of the invention and not in a limiting sense.

The embodiments of the invention in which an exclusive property or privilege is claimed are as follows:

1. A loading dock bumper comprising:
    (a) a first rigid part for fastening to said dock;
    (b) a second rigid part directly engaged with said first rigid part by at least one connecting device, said engaged first and second rigid parts defining a substantially enclosed hollow therebetween; and
    (c) a compressible resilient material contained within said substantially enclosed hollow,
    wherein said second rigid part is moveable with respect to said first rigid part between a first position wherein said compressible resilient material is not compressed and a second position wherein said compressible resilient material is compressed, wherein any load applied to said bumper moves said second rigid part towards said second position and compresses said compressible resilient material to provide dampening of the load applied.

2. The loading dock bumper of claim 1 wherein said at least one connecting device is a plurality of engaging flanges.

3. The loading dock bumper of claim 1 wherein said at least one connecting device is a rod.

4. The loading dock bumper of claim 1 wherein said resilient material is laminate rubber.

5. The loading dock bumper of claim 1 wherein said second part further comprises a front having a top and a bottom, when proximate said top there is at least one substantially chamfered edge.

6. The loading dock bumper of claim 1 wherein said second part further comprises at least one vehicle positioning indicia.

7. The loading dock bumper of claim 6 wherein said at least one vehicle position indicia is substantially recessed.

8. A loading dock bumper for use with a loading dock, said loading dock bumper comprising:
  (i) a substantially enclosed container comprising a first half, said first half having a back, and four sides extending substantially normal to said back, at least two of said four sides of said first half further comprise a flange on each of said two sides,
  (ii) a second half substantially larger than said first half made of substantially carbon steel, said second half having a front, and four sides extending substantially normal to said front, wherein at least two of said four sides of said second half further comprise a flange on each of said two sides, wherein said flanges of said second half sides matingly engage with said flanges of said first half sides, when assembled with said first half and provide for movement of said first and second halves relative to each other forming a substantially enclosed hollow container, wherein said mating flanges prevent disassembly of said halves as said first half and said second half move between a first position and a second position; and
  (iii) an effective amount of substantially compressible resilient material contained within the hollow of said substantially enclosed container such that in the first position, said back of said first half and said front of said second half are a predetermined distance from each other due to the rubber material being substantially uncompressed within said hollow of the substantially enclosed container and upon the introduction of a load to said substantially enclosed container, said resilient material is substantially compressed by the load substantially dampening the load as said second half moves towards said first half.

9. A loading dock bumper for use with a loading dock, said loading dock bumper comprising:
  (i) a substantially enclosed container comprising a first half, said first half having a back, and four sides extending substantially normal to said back, at least one substantially elongated aperture located at a predetermined position on one of said sides of said first half, and at least another substantially elongated aperture located at a predetermined position on one of the other sides of said first half opposed said side having said at least one substantially elongated aperture thereon,
  (ii) a second half substantially larger than said first half, said second half having a front, and four sides extending substantially normal to said front, at least one aperture located at a predetermined position on one of said sides of said second half, and at least another aperture located at a predetermined position on one of the other sides of said second half opposed said side having said at least one aperture thereon, said second half and said apertures thereof matingly fitting over and aligning with said first half and the elongated apertures thereof proximate the sides thereof, form ing a substantially enclosed hollow container, such that said elongated apertures of said first half a and said apertures of said second half are substantially axially aligned with each other when the first and second halves are inter-fitted,
  (iii) a connecting device running through the apertures, connecting the first half with the second half, wherein said connection allows said first half and said second half to be substantially moveable with respect to each other,
  (iv) an effective amount of substantially compressible resilient material contained within said substantially enclosed container wherein in a first position, said back of said first half and said front of said second half are a predetermined distance from each other due to the rubber material being substantially uncompressed within said substantially enclosed container and upon the introduction of a load to the front of said container, said resilient material is substantially compressed by the load moving the halves towards one another, thereby substantially absorbing the shock of the load.

10. A substantially open-faced loading dock bumper comprising:
  (a) at least one resilient member;
  (b) at least one resilient member support for supporting said at least one resilient member;
  (c) at least one resilient member wear indicator proximate said at least one resilient member; and
  (d) at least one mounting element for mounting said bumper to said loading dock.

11. The loading dock bumper of claim 10 further comprising at least one vehicle positioning indicia.

12. The loading dock bumper of claim 11 wherein said at least one vehicle positioning indicia is integral with said at least one resilient member wear indicator.

13. The loading dock bumper of claim 10 wherein said at least one resilient member is a plurality of resilient members.

14. The loading dock bumper of claim 13 wherein the plurality of resilient members are substantially arranged face-to-face in a substantially stacked relationship.

15. The loading dock bumper of claim 10 wherein the at least one resilient member support is at least one bracket.

16. The loading dock bumper of claim 10 wherein said wear indicator is integral with said at least one resilient member.

17. The loading dock bumper of claim 10, wherein said at least one mounting element is integral with said at least one resilient member support.

18. The loading dock bumper of claim 11 wherein said at least one vehicle positioning indicia is of a substantially reflective media.

19. The loading dock bumper of claim 16 wherein said at least one resilient member comprising said wear indicator having at least a first portion of a first indicia and at least a second portion of a second indicia proximate said first portion.

20. A substantially open-faced loading dock bumper comprising:
  (i) a plurality of resilient members, substantially arranged face-to-face in a substantially stacked relationship, said stack having at least two outer face ends, said members having at least one aperture located at a predetermined position on each member;

(ii) a pair of brackets made of a substantially non-resilient material, each of said pair of brackets abut the outer face ends of the stack, said pair of brackets having at least one aperture located at a predetermined position on the first bracket of said pair of brackets, and at least another aperture located at a predetermined position on the second bracket of said pair of brackets;

(iii) at least one mounting element made of a substantially non-resilient material, said mounting element having a front, a back and two sides, and at least one connecting aperture located at a predetermined position on one of said sides, and at least another connecting aperture located at a predetermined position on one of the other sides opposed said side having said at least one connecting aperture thereon, at least one mounting aperture located at a predetermined position on said front, and at least another mounting aperture located at a predetermined position on said back opposed said front having said at least one mounting aperture thereon;

(iv) at least one connecting member made of a substantially non-resilient material, said connecting member extending through said at least one aperture of said resilient members and through said at least one connecting aperture of said mounting element, connecting the first and second brackets of said pair of brackets through said at least one aperture of said pair of brackets, such that said connection retains said resilient members and said mounting elements clamped in a substantially compressed mode between said pair of brackets as an integral unit;

(v) at least one vehicle positioning indicia made of a substantially reflective media;

(vi) at least one resilient member wear indicator proximate said plurality of said resilient members.

21. The loading dock bumper of claim 18 wherein said vehicle positioning indicia is integral with said at least one resilient member wear indicator.

22. The loading dock bumper of claim 8 or 10 where said front further comprises a substantially chamfered edge proximate at least one side thereof.

23. The loading dock bumper of claim 8 or 9 further comprising at least one vehicle positing indicia.

24. The loading dock bumper of claim 9 wherein said loading dock bumper further comprises a collar connecting said at least one substantially elongated aperture with said at least another substantially elongated aperture.

* * * * *

UNITED STATES PATENT AND TRADEMARK OFFICE
CERTIFICATE OF CORRECTION

PATENT NO. : 6,120,871
DATED : September 19, 2000
INVENTOR(S) : Joseph Di Biase

It is certified that error appears in the above-identified patent and that said Letters Patent is hereby corrected as shown below:

Please delete:

[75] Inventor: Joseph De Biase, Rexdale, Canada

Please insert:

[75] Inventor: Joseph Di Biase, Rexdale, Canada

Signed and Sealed this

Fifteenth Day of May, 2001

*Attest:*

NICHOLAS P. GODICI

*Attesting Officer*     *Acting Director of the United States Patent and Trademark Office*